(12) United States Patent
Richter et al.

(10) Patent No.: US 12,078,741 B1
(45) Date of Patent: Sep. 3, 2024

(54) METHOD AND SYSTEM FOR SELECTIVELY APPLYING DEEP LEARNING TO SENSOR FUSION BASED PASSIVE OUTDOOR LOCALIZATION OF RADIO FREQUENCY TRANSMITTING SOURCES

(71) Applicant: R2 Wireless Ltd., Kokhav Yair (IL)

(72) Inventors: Rei Richter, Kokhav Yair (IL); Yosef Yaacov Nelkenbaum, Kokhav Yair (IL); Yiftach Richter, Kokhav Yair (IL)

(73) Assignee: R2 Wireless Ltd., Kokhav Yair (IL)

( * ) Notice: Subject to any disclaimer, the term of this patent is extended or adjusted under 35 U.S.C. 154(b) by 0 days.

(21) Appl. No.: 18/476,648

(22) Filed: Sep. 28, 2023

(51) Int. Cl.
  *G01S 5/02* (2010.01)
  *H04W 64/00* (2009.01)

(52) U.S. Cl.
  CPC ........ *G01S 5/0252* (2013.01); *G01S 5/02213* (2020.05); *G01S 5/0284* (2013.01); *H04W 64/006* (2013.01)

(58) Field of Classification Search
  CPC .. G01S 5/0252; G01S 5/02213; G01S 5/0284; H04W 64/006
  See application file for complete search history.

(56) References Cited

U.S. PATENT DOCUMENTS

2020/0182959 A1\* 6/2020 Markhovsky ........... G01S 19/05

FOREIGN PATENT DOCUMENTS

CN 103002576 A \* 3/2013

\* cited by examiner

*Primary Examiner* — Mazda Sabouri
(74) *Attorney, Agent, or Firm* — PEARL COHEN ZEDEK LATZER BARATZ LLP (57) ABSTRACT

A method and system for selectively applying machine learning to data fusion of a plurality of localization and classification of radio frequency (RF) emitters in an area are provided herein. The system may include: a sensor array of radio frequency sensors deployed outdoors, wherein each sensor is configured to perform synchronized sensor measurements of at least three types; at least one computer processor in communication with the sensor array and configured to apply a data fusion algorithm to the sensor measurements, to yield localization and classification data of the RF emitters; a machine learning module configured to obtain over a training period, localization data collected from at least the localization measurement of the three types of sensor measurements; train a model of to provide outputs of the localization measurement of the first type based on readings of the localization measurement of at least one of the two other types.

12 Claims, 7 Drawing Sheets

METHOD AND SYSTEM FOR SELECTIVELY APPLYING DEEP LEARNING TO SENSOR FUSION BASED PASSIVE OUTDOOR LOCALIZATION OF RADIO FREQUENCY TRANSMITTING SOURCES

FIELD OF THE INVENTION

The present invention relates generally to the field of signal processing of radio frequency signals, and more particularly to using sensor fusion and deep learning to accurately localize radio frequency sources in an outdoor environment.

BACKGROUND OF THE INVENTION

Passive localization and classification of radio frequency (RF) emitters in an outdoor environment is a well-known and complicated challenge. Over the years, many solutions have been suggested on how to address it. Some solutions rely upon measuring the received signal strength indicator (RSSI), some solutions rely on the angle of arrival (AOA) of the received signals, and some solutions rely on calculating the time difference of flight (TDOA) between the received signals. All solutions require an array of sensors and one or more processing units which process the sensor data.

Recently, some solutions have been suggested to combine two or more of the traditional localization technologies to achieve data fusion.

Additionally, more and more sensors are implemented in the form of software defined radio (SDR) so that the use of machine learning (ML) and deep learning (DL) are more easily introduced to the calibration process as well as the localization and classification of the emitters.

While some localization solutions require line-of-sight (LoS) measurements between the RF emitters and the sensors, some solutions can perform non-LoS measurements, but on the other hand may require more data. Some techniques are limited to two dimensions, and some may perform localization at three dimension but require more consideration in deploying the sensors.

Applying machine learning and deep learning on a large scale may be computationally prohibitive as this may require training the sensor fusion algorithm over a very large number of samples in the entire area where the sensors are deployed.

Therefore, there is a need for a cost-effective comprehensive solution that may selectively apply the most appropriate localization type to the conditions of the environment on an ad hoc basis, for reducing the processing power as well as the latency.

SUMMARY OF THE INVENTION

In order to overcome the aforementioned challenges of current sensor fusion based localization systems, it is suggested to limit the use of machine learning and deep learning only to specific regions within the entire area where the sensors are deployed, where the machine learning or the deep learning are necessary.

Some embodiments of the present invention provide a smart fusion of multiple types of measurements to produce localization and classification estimates. The measurement types can include for example TDOA, AOA, RSSI and fingerprinting. One example is that each sensor is used to assign a score to each geolocation point in the entire area and to each target class (which represents the probability that a target of this class is located at that geolocation point) and the fusion algorithm linearly combines the scores from all sensors using weights that are separately optimized to each region in the area.

According to some embodiments all measurements may be fed to a deep learning or a machine learning model which is trained to find the best localization and classification estimates.

Advantageously, embodiments of the present invention contribute to reducing the system complexity by applying fingerprinting only in regions where it brings a significant benefit.

For example, such regions can be characterized using theoretical performance bounds (e.g., Cramer-Rao lower bound). Alternatively, the regions can be characterized through the fusion algorithm (e.g., applying fingerprinting only where its combining weight is above a threshold).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The present invention, in embodiments thereof, provide fusion algorithm on commercial SDR component that implements TDoA/AoA/RSSI traditional algorithms on each RF sample to create a real time fusion to optimize the location performance within off-the-shelf SDR component limitation. For each IQ sample, the system in accordance with some embodiments of the present invention, is performing AoA, TDoA and RSSI. It fuses the output data differently, by applying scores, compared with the common hybrid processing.

Embodiments of the present invention provide a system for selectively applying machine learning to data fusion of a plurality of localization and classification of radio frequency (RF) emitters in an area.

Figure 1:
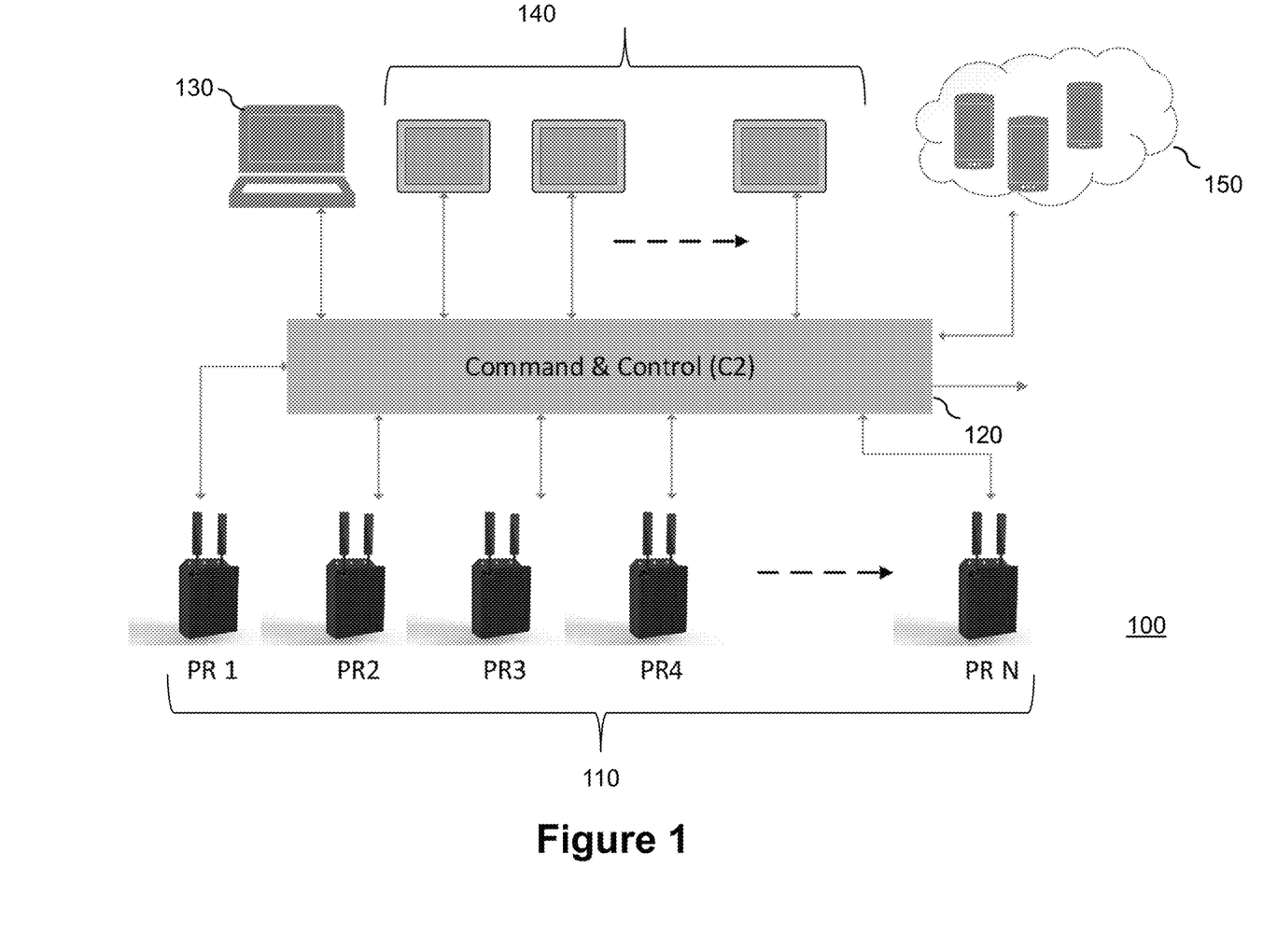
FIG. 1 is high-level block diagrams illustrating a system with embodiments of the present invention.

FIG. 1 is high-level block diagram illustrating system 100 for selectively applying machine learning to data fusion of a plurality of localization and classification of radio frequency (RF) emitters (not shown here) in an area in accordance with embodiments of the present invention. System 100 may include a sensor array of radio frequency sensors PR1-PRN deployed outdoors, wherein each sensor being a software-defined radio (SDR) component configured to perform synchronized sensor measurements of at least two of three types of TDOA/AOA/RSS traditional localization techniques.

The system may further include at least one computer processor (e.g., command and control unit 120) in communication with the sensor array PR1-PRN and configured to apply a data fusion algorithm to the sensor measurements, to yield localization and classification data of the RF emitters.

System 100 may include a computer terminal 130, user interface devices 140 and may be connectable to portable computing devices such as smartphones 150 for interfacing with system 100.

System 100 may further include a computer memory implemented on command and control unit 120 having a machine learning module comprising a set of instructions that, when executed, cause the at least one computer processor to: obtain over a training period, localization data collected from at least the localization measurement of the three types of sensor measurements; train a model of to provide outputs of the localization measurement of the first type based on readings of the localization measurement of at least one of the two other types. apply, in a production period, the model to readings of the localization measurements of the first type in absence of the localization measurement of at least one of the two other types, to yield the outputs of the localization sensor of the first type, only in certain conditions where the data fusion algorithm does not provide the localization and classification data of the RF emitters beyond a predefined threshold.

Figure 2:
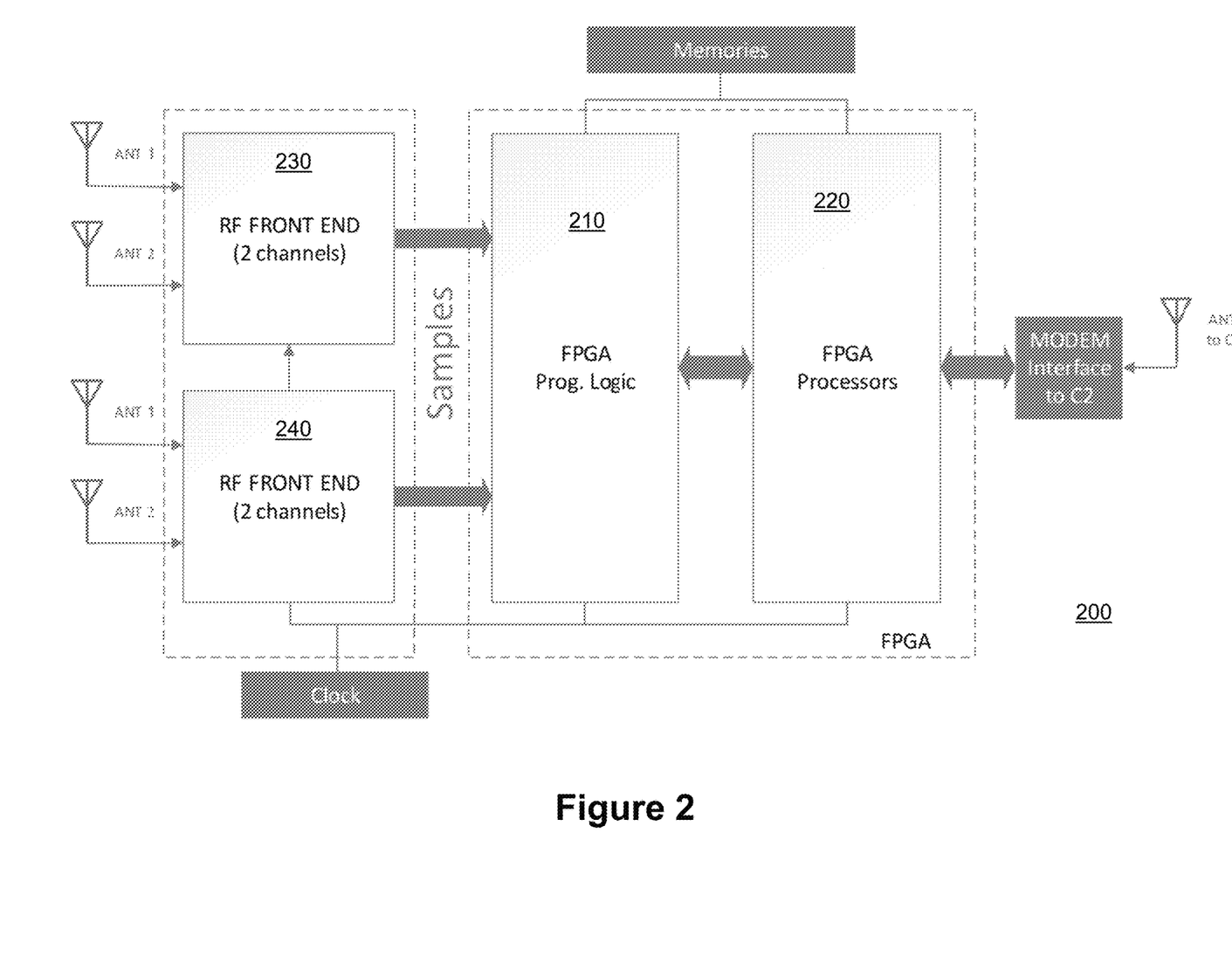
FIG. 2 is high-level block diagrams illustrating a sensor in accordance with embodiments of the present invention.

FIG. 2 is high-level block diagram illustrating a sensor 200 in accordance with embodiments of the present invention. On the sensor level, embodiments of the present invention optimize performance by fusion of TDOA/AOA/RSS traditional localization techniques within a single commercial SDR component overcoming its inherent limitations. Sensor 200 has one or more RF antennas ANT1, ANT2 connected to respective RF front end 240, 240. Sensor 200 further includes processors unit 220 and programmable logic unit 210 both possibly implemented as field programmable gates array (FPGA). Sensor 200 also includes a modem and a respective antenna for communicating with the command-and-control unit 120 of system 100.

On the system level a cloud-based command and control in accordance with embodiments of the present invention combines the sensors to a coordinated array with advanced performance while optimizing the data flow cost/rate between its units.

Figure 3:
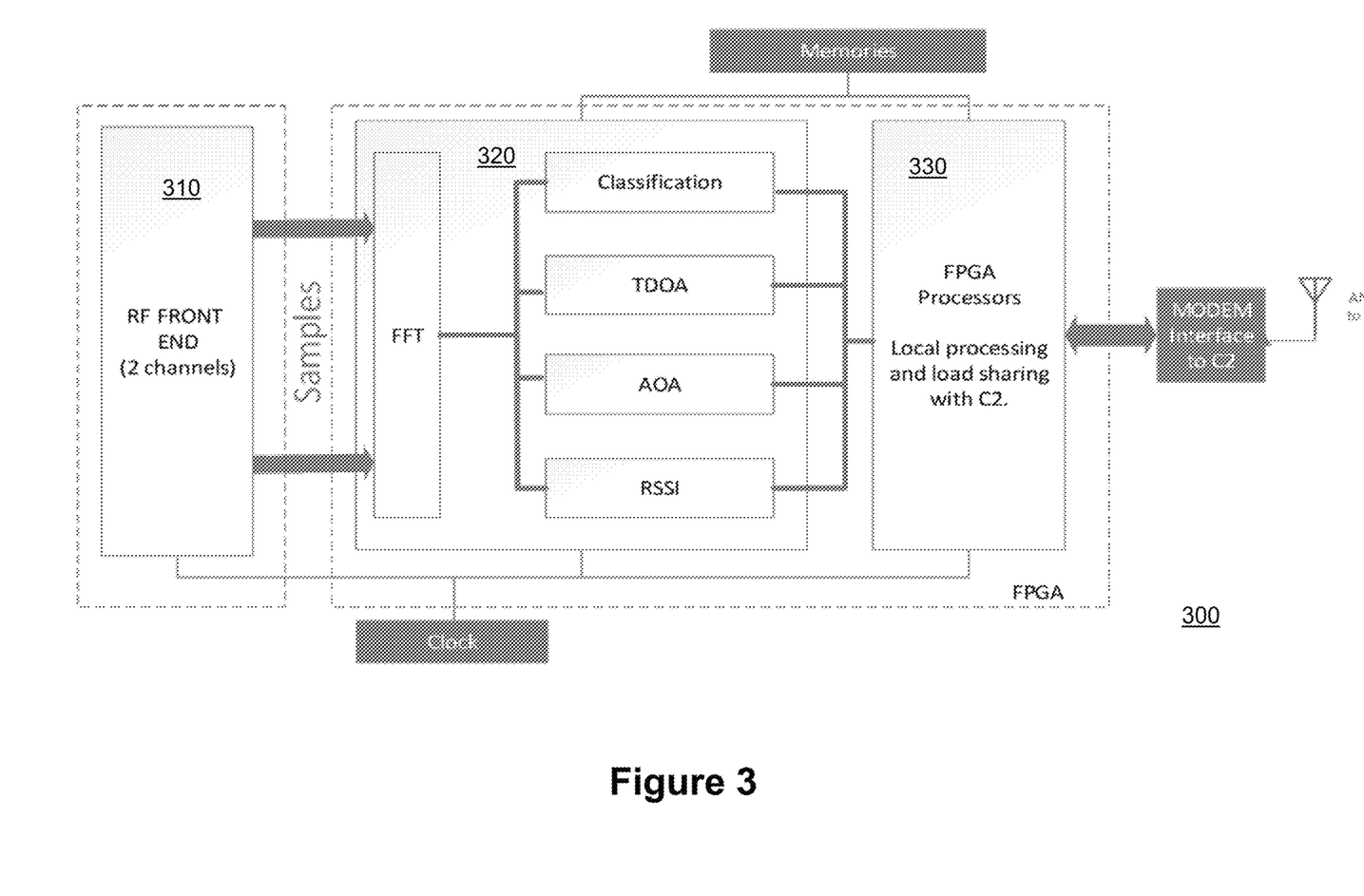
FIG. 3 is high-level block diagrams illustrating peripherals of a sensor in accordance with embodiments of the present invention.
Figure 4A:
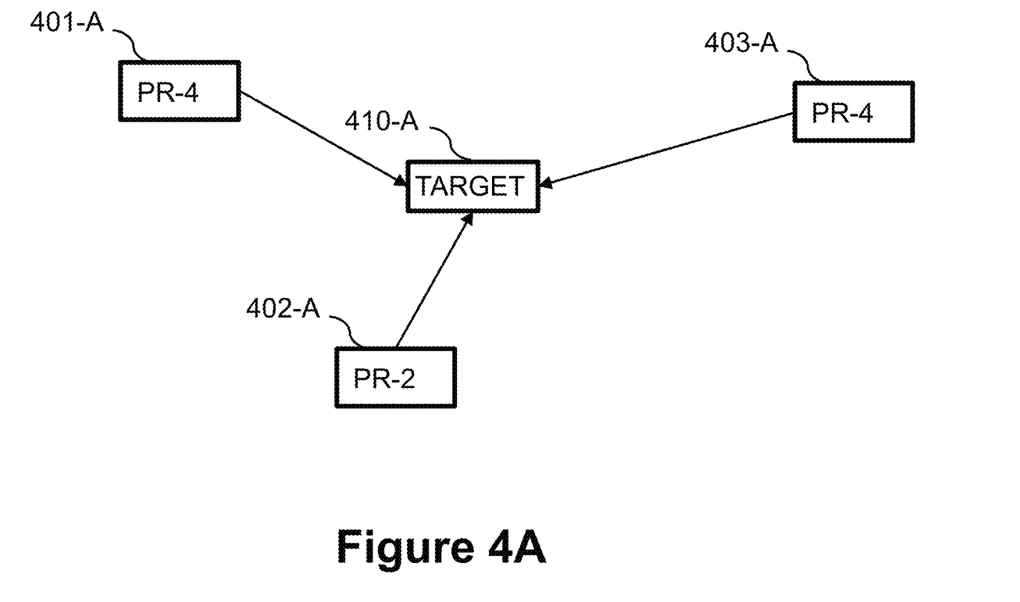
FIGS. 4A-4E are high-level block diagrams illustrating an aspect of a system in accordance with embodiments of the present invention.
Figure 4B:
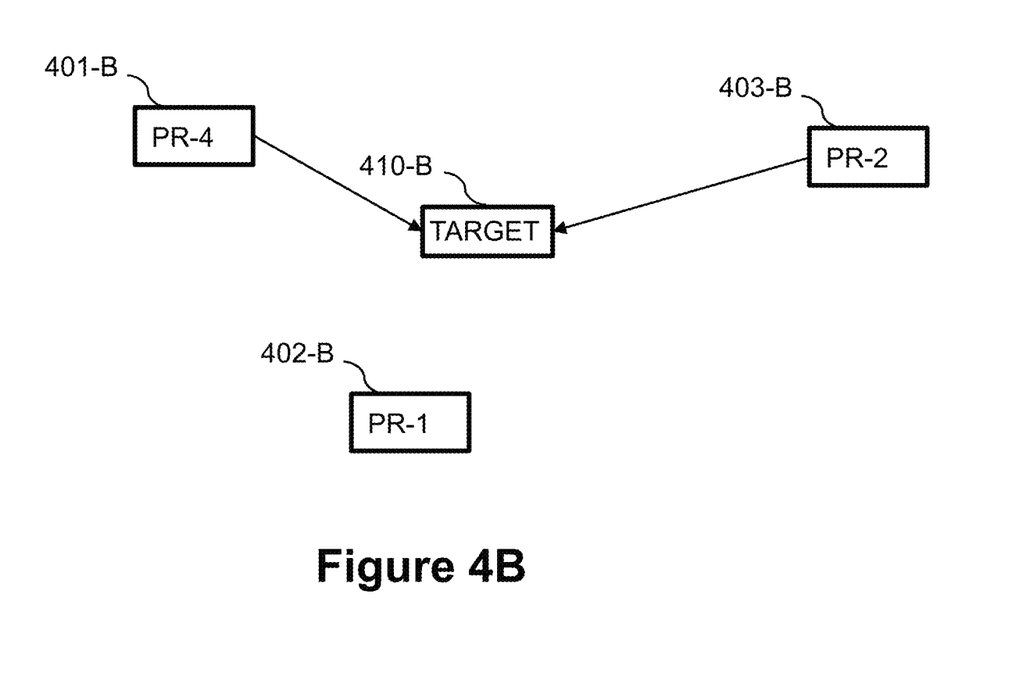
Figure 4C:
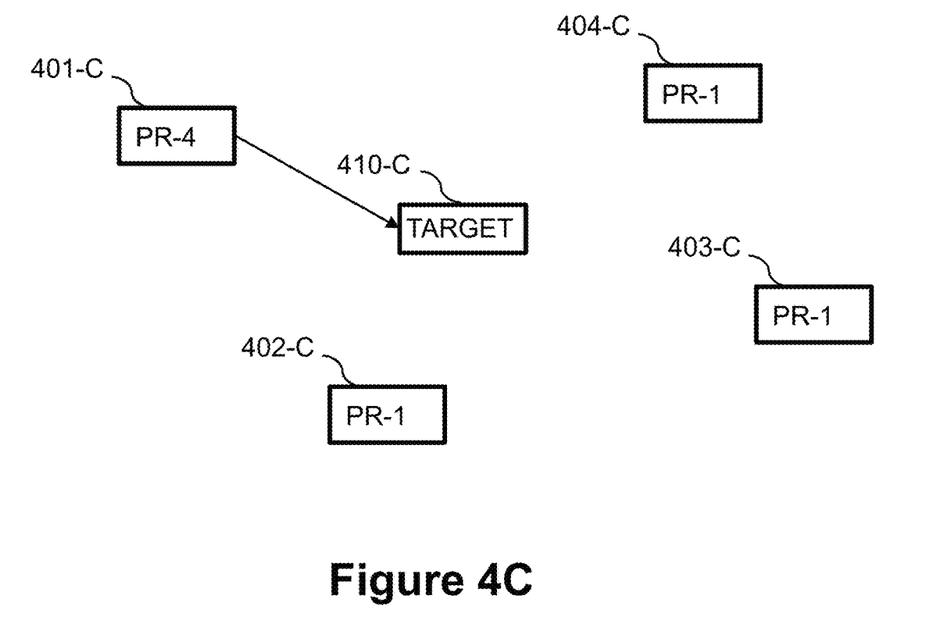
Figure 4D:
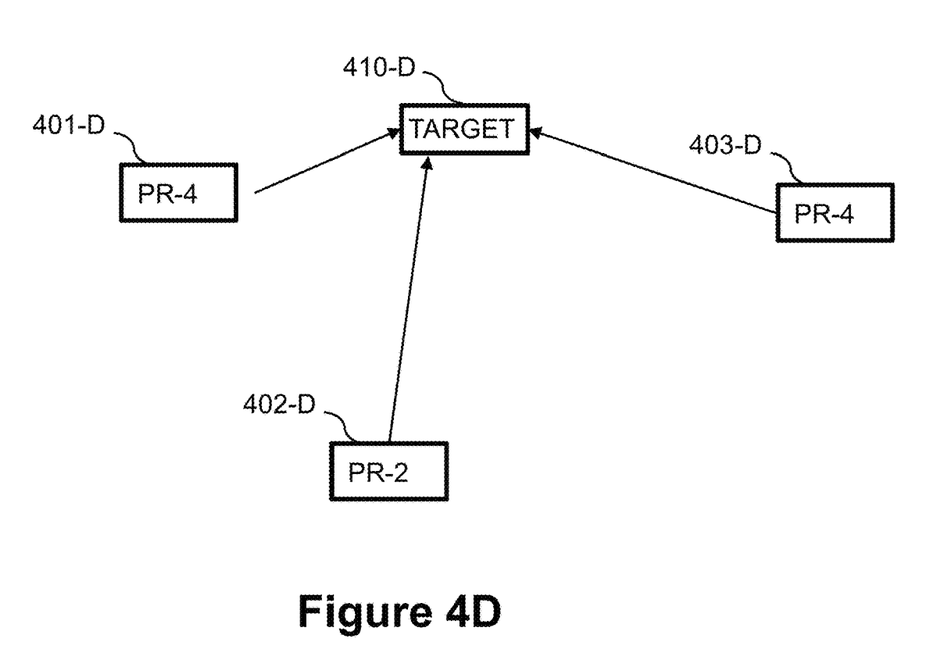
Figure 4E:
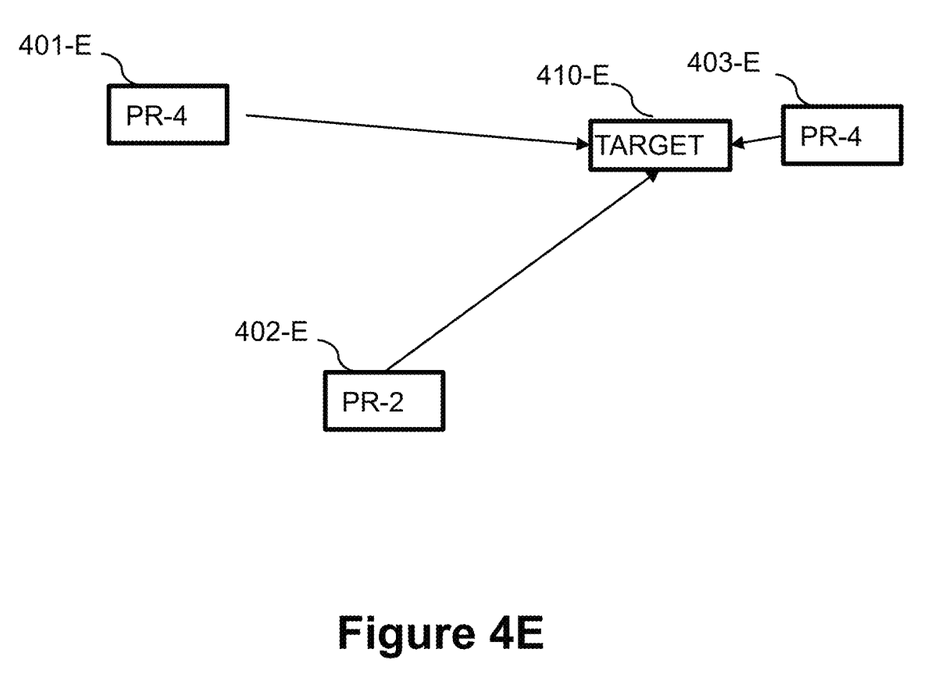

FIG. 3 is high-level block diagrams illustrating peripherals 300 of a sensor in accordance with embodiments of the present invention. Such peripherals 300 may include: RF front end 310 connectable to the antennas (not shown here); logic unit 320 possibly implemented as FPGA implements two or more localization techniques (namely TDOA, AOA, and RSSI) as well as classification; processors unit 330 enables local processing of the sensed samples as well as load balancing of the processing with processors on the command-and-control unit (not shown here).

FIGS. 4A-4E are high-level block diagrams illustrating an aspect of a system in accordance with embodiments of the present invention. FIGS. 4A-4E show typical deployment use cases of RF emitters (marked target 410-A to 410-E) and sensors 410-A to 410-E, 420-A to 420-E, and 430-A to 430-E (with the number after the "PR" indicating the number of antennas so PR-1 is a sensor with one antenna and PR-4 is a sensor with 4 antennas). These scenarios may be part of a training process in which an RF emitter with a known location (e.g. using GPS) is detected by two or more sensors of the system and the most suitable type of localization techniques is applied for accuracy. Specifically, different weights can be applied to the various techniques in data fusion, based on the actual deployment which factors in, the relative location of the target, the numbers of antennas on each sensor and the proximity of each sensor to the target. These scenarios form the basis for machine learning and deep learning process so that in a production mode, the system can apply the most suitable weights for the various localization techniques.

Embodiments of the present invention provide a sensor array which detects, classify, and localize emitters with fusion of traditional methods that are optimize to line-of-sight (LoS) environment and further combine machine learning to cover non line of sight environment. In order to achieve the training, it is suggested by inventors of the present invention to use robots such as drones that scan the area and transmits test signal for optimization first scan maps the LoS and non-LoS environment thus the further trainings are focus only on non-LoS environment.

In some embodiments, machine learning supports the identifying of new abnormal emitters behavior suspected as malicious RF attack so they can be factored out in the localization and classification process.

In some embodiments, machine learning may be needed in the area where the TDOA and AOA fusion are not optimal. In the workflow of embodiments of the system of the present invention identifies those area for machine learning training and it is assumed that in rural areas it will be small area while in urban it will be most of the covered area.

In some embodiments, in addition to the training robot, stationary emitters in the coverage area like cellular base stations, Wi-Fi hotspots may enable continuous training to identify changes in the environment and the influence of weather on the RF link. Those stationary emitters can be functional or installed only for training.

In some embodiments, a TDOA and AOA fusion algorithm is used as a default, to optimize the localization performance most of the time. However, in challenging areas that are predefined in the system calibration phase the system goes into a machine learning mode.

In some embodiments, with reference to the TDOA and AOA fusion algorithm, even in an ideal scenario, joint estimation that is based both on AOA and TDOA is quite complicated due to the nonlinearity of the problem. Thus, even algorithms that are planned for ideal scenarios turn to sub-optimal estimation. For example, the joint estimation algorithm in the attached article converts the problem to a linear problem through smart approximations.

In some embodiments, the fusion algorithm may be based on the geometric equations that connect the TDOA and AOA measurements to the actual target location. Then, using first order approximation of the error terms leads to a linear equation that can be solved efficiently. Yet, this equation requires the knowledge of a trigonometric based matrix that is based on the actual target location. Hence, the algorithm requires an additional step that performs an initial estimation of the target location, and then an update stage that uses the trigonometric based matrix with the initial location estimation.

In some embodiments, the fusion algorithm may collect the TOA and TDOA measurements and constructs from them a (3M−1)×(3M−1) dimensional matrix equation (where M is the number of sensors). This matrix equation is solved using linear algebra. Then, the matrix equation is updated using the initial estimation and solved again to improve the accuracy.

Load sharing and fusion algorithm between the sensors and the cloud command and control (C2). This mechanism enables the capability to overcome the computing power limitation of the sensors and reduce its power consumption. The load sharing approach requires high level of time synchronization between all sensors for TDOA but may not requite it for AOA and RSSI.

In some embodiments, the system employs proprietary local time synchronization in resolution below 20 nano-sec, which enhance the localization accuracy and overcome the GNSS signal (e.g., GPS) limitation (vulnerability to jammers and spoofers and PPS synchronization in resolution above 25 nano-sec.)

In some embodiments, commercial SDR component (mainly the low-cost components) has a gap in its inputs phase sync capabilities. To overcome this limitation and enable the use of this components, the AOA algorithm may be configured to leverage the system time synchronization to create AOA array composed of independent subarray (either non-synced inputs of same component or between components)

In some embodiments, based on the implementation the above unique capabilities, the system can enhance the following capabilities:

AOA LOS/non-LOS differentiation: Taking advantage of the high level of time synchronization, the AOA algorithm may enable an effective way of overcoming dense multipath environment. It differentiates between LoS (Line-of-Sight) and non-LoS measurements, leveraging those results to improve the overall localization results.

Three-dimensional measurement: Traditional hybrid of TDOA/AOA refer to measurements in same X, Y plane without 3 dimensions capabilities. The TDOA/AOA algorithm according to the system of the present invention enables the flexibility of 3 dimensions measurements close to the PR and standard 2 dimension in other cases. This capability is important in case of drones' localization.

Navigation in GNSS blocked areas: the system can serve as a navigation system in GNSS blocked areas for military and civilian use. A pedestrian, vehicle and unmanned arial vehicle carrying low-cost transceiver can use the system localization capabilities for navigation.

Figure 5:
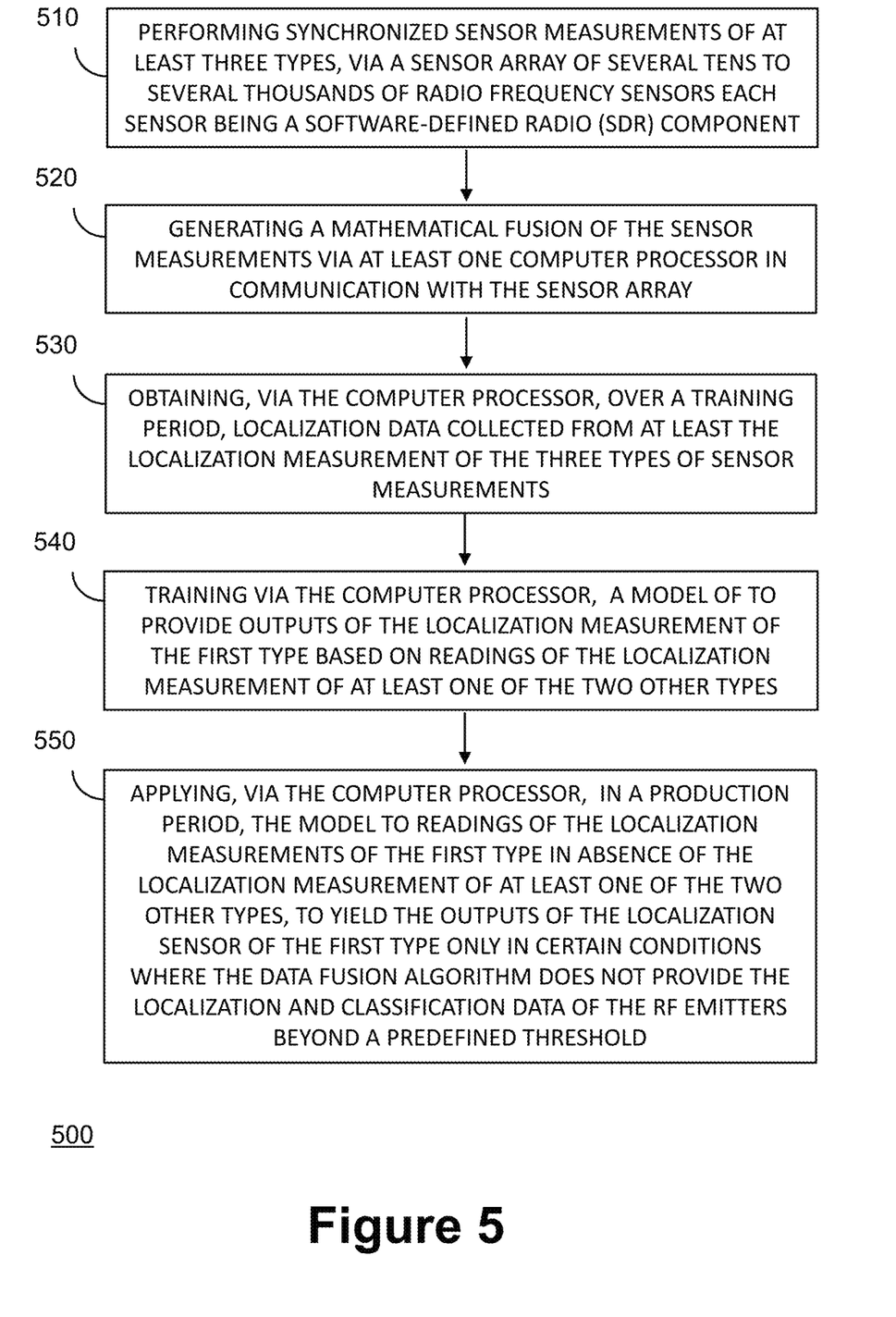
FIG. 5 is a high-level flowchart illustrating a method with embodiments of the present invention.

FIG. 5 is a high-level flowchart illustrating a method for selectively applying machine learning to data fusion of a plurality of localization and classification of radio frequency (RF) emitters in an area in accordance with embodiments of the present invention. Method 500 may include the following steps: performing synchronized sensor measurements of at least three types using a sensor array of radio frequency sensors deployed outdoors, wherein each sensor being a software-defined radio (SDR) component 510; applying, using at least one computer processor in communication with the sensor array, a data fusion algorithm to the sensor measurements, to yield localization and classification data of the RF emitters 530; obtaining over a training period, localization data collected from at least the localization measurement of the three types of sensor measurements 540; training a model of to provide outputs of the localization measurement of the first type based on readings of the localization measurement of at least one of the two other types 550; and applying, in a production period, the model to readings of the localization measurements of the first type in absence of the localization measurement of at least one of the two other types, to yield the outputs of the localization sensor of the first type, only in certain conditions where the data fusion algorithm does not provide the localization and classification data of the rf emitters beyond a predefined threshold 560.

It is further understood that some embodiments of the present invention may be embodied in the form of a system, a method, or a computer program product. Similarly, some embodiments may be embodied as hardware, software, or a combination of both. Some embodiments may be embodied as a computer program product saved on one or more non-transitory computer-readable medium (or mediums) in the form of computer-readable program code embodied thereon. Such non-transitory computer-readable medium may include instructions that when executed cause a processor to execute method steps in accordance with embodiments. In some embodiments, the instructions stored on the computer-readable medium may be in the form of an installed application and in the form of an installation package.

Such instructions may be, for example, loaded by one or more processors and get executed. For example, the computer-readable medium may be a non-transitory computer-readable storage medium. A non-transitory computer-readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

One skilled in the art will realize that the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units, and/or circuits have not been described in detail so as not to obscure the invention. Some features or elements described with respect to one embodiment can be combined with features or elements described with respect to other embodiments.

The invention claimed is:

1. A system for selectively applying machine learning to data fusion of a plurality of localization and classification of radio frequency (RF) emitters in an area, the system comprising:
   a sensor array of RF sensors deployed outdoors, wherein each sensor being a software-defined radio (SDR) component configured to perform synchronized sensor measurements of at least three types, wherein the synchronized sensor measurements comprise localization measurement;
   at least one computer processor in communication with the sensor array and configured to apply a data fusion algorithm to the sensor measurements, to yield localization and classification data of the RF emitters; and
   a computer memory having a machine learning module comprising a set of instructions that, when executed, cause the at least one computer processor to:
   obtain over a training period, localization data collected from at least the localization measurement of the three types of sensor measurements;
   train a model of to provide outputs of the localization measurement of the first type based on readings of the localization measurement of at least one of the two other types;
   apply, in a production period, the model to readings of the localization measurements of the first type in absence of the localization measurement of at least one of the two other types, to yield the outputs of the localization measurement of the first type, only in an absence of a line-of-sight (LoS) between the RF emitters and the RF sensors.

2. The system according to claim 1, wherein the three types of sensor measurements include: time difference of arrival (TDOA), angle of arrival (AOA) and received signal strength (RSS).

3. The system according to claim 1, wherein the computer processor is configured to obtain the localization data collected from at least the localization measurement of the three types of sensor measurements over a training period further from a GPS system.

4. The system according to claim 1, wherein the sensor fusion and the machine learning are carried out two different computer processors for load balancing.

5. A method for selectively applying machine learning to data fusion of a plurality of localization and classification of radio frequency (RF) emitters in an area, the method comprising:
   performing synchronized sensor measurements of at least three types using a sensor array of RF sensors deployed outdoors, wherein the synchronized sensor measurements comprise localization measurement, and wherein each sensor being a software-defined radio (SDR) component;
   applying, using at least one computer processor in communication with the sensor array, a data fusion algorithm to the sensor measurements, to yield localization and classification data of the RF emitters;
   obtaining over a training period, localization data collected from at least the localization measurement of the three types of sensor measurements;

training a model of to provide outputs of the localization measurement of the first type based on readings of the localization measurement of at least one of the two other types; and
   applying, in a production period, the model to readings of the localization measurements of the first type in absence of the localization measurement of at least one of the two other types, to yield the outputs of the localization measurement of the first type, only in an absence of a line-of-sight (LoS) between the RF emitters and the RF sensors.

6. The method according to claim 5, wherein the three types of sensor measurements include: time difference of arrival (TDOA), angle of arrival (AOA) and received signal strength (RSS).

7. The method according to claim 5, wherein obtaining the localization data collected from at least the localization measurement of the three types of sensor measurements over a training period further includes obtaining the localization data from a GPS system.

8. The method according to claim 5, wherein the sensor fusion and the machine learning are carried out by two different computer processors for load balancing.

9. A non-transitory computer readable storage medium for selectively applying machine learning to data fusion of a plurality of localization and classification of radio frequency (RF) emitters in an area, the computer readable storage medium comprising a set of instructions that, when executed, cause at least one computer processor to:
   receive synchronized sensor measurements of at least three types, wherein the synchronized sensor measurements comprise localization measurement, using a sensor array of RF sensors deployed outdoors, wherein each sensor being a software-defined radio (SDR) component;
   apply, a data fusion algorithm to the sensor measurements, to yield localization and classification data of the RF emitters;
   obtain over a training period, localization data collected from at least the localization measurement of the three types of sensor measurements;
   train a model of to provide outputs of the localization measurement of the first type based on readings of the localization measurement of at least one of the two other types; and
   apply, in a production period, the model to readings of the localization measurements of the first type in absence of the localization measurement of at least one of the two other types, to yield the outputs of the localization measurement of the first type, only in an absence of a line-of-sight (LoS) between the RF emitters and the RF sensors.

10. The non-transitory computer readable storage medium according to claim 9, wherein the three types of sensor measurements include: time difference of arrival (TDOA), angle of arrival (AOA) and received signal strength (RSS).

11. The non-transitory computer readable storage medium according to claim 9, further comprising a set of instructions that, when executed, cause at least one computer processor to obtain the localization data collected from at least the localization measurement of the three types of sensor measurements over a training period further from a GPS system.

12. The non-transitory computer readable storage medium according to claim 9, wherein the sensor fusion and the machine learning are carried out two different computer processors for load balancing.

\* \* \* \* \*